(12) United States Patent
He et al.

(10) Patent No.: US 11,064,473 B2
(45) Date of Patent: Jul. 13, 2021

(54) TRANSMISSION DOWNLINK CONTROL INFORMATION FOR NEW RADIO (NR) SYSTEM

(71) Applicant: Apple Inc., Cupertino, CA (US)

(72) Inventors: Hong He, Sunnyvale, CA (US); Debdeep Chatterjee, San Jose, CA (US); Ajit Nimbalker, Fremont, CA (US); Dae Won Lee, Portland, OR (US); Gang Xiong, Portland, OR (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/247,187

(22) Filed: Jan. 14, 2019

(65) Prior Publication Data

US 2019/0223160 A1 Jul. 18, 2019

Related U.S. Application Data

(60) Provisional application No. 62/617,109, filed on Jan. 12, 2018.

(51) Int. Cl.
| | |
|---|---|
| *H04W 72/04* | (2009.01) |
| *H04W 68/02* | (2009.01) |
| *H04L 5/00* | (2006.01) |
| *H04W 72/12* | (2009.01) |
| *H04W 4/40* | (2018.01) |
| *H04W 74/08* | (2009.01) |

(52) U.S. Cl.
CPC ......... *H04W 72/042* (2013.01); *H04L 5/0053* (2013.01); *H04W 68/02* (2013.01); *H04W 72/1289* (2013.01); *H04W 4/40* (2018.02); *H04W 74/0833* (2013.01)

(58) Field of Classification Search
CPC ........... H04W 72/042; H04W 72/1289; H04W 68/02; H04W 74/0833; H04W 4/40; H04W 68/005; H04L 5/0053; H04L 1/00; H04L 5/0046; H04L 5/0007
See application file for complete search history.

(56) References Cited

U.S. PATENT DOCUMENTS

2011/0143796 A1\* 6/2011 Lee, II .................. H04L 1/0031
455/507
2011/0299489 A1\* 12/2011 Kim ...................... H04L 1/0061
370/329

(Continued)

*Primary Examiner* — Jay P Patel
(74) *Attorney, Agent, or Firm* — Eschweiler & Potashnik, LLC

(57) ABSTRACT

A user equipment (UE) or network device gNB can process or generate downlink control information transmissions for new radio (NR) systems or networks based on a compact DCI format. The DCI can include a grouped broadcast message for reduced signaling overhead that comprises random access response (RAR) message, a paging message, a system information block (SIB) message, another message information type, or any combination thereof. The DCI transmission can be determined as comprising paging information based on a direct indication in a physical downlink control channel (PDCCH) only or both in the PDCCH and a physical downlink shared channel (PDSCH) based on a flag field of the DCI transmission. Other configurations can also further reduce signaling overhead additionally or alternatively.

20 Claims, 15 Drawing Sheets

TBS_TABLE_1_0

| TBS_indicator \ I_TBS | 0 | 1 | 2 | 3 | 4 | 5 | 6 | 7 |
|---|---|---|---|---|---|---|---|---|
| TBS_indicator = 0 | 32 | 56 | 72 | 104 | 120 | 144 | 176 | 224 |
| TBS_indicator = 1 | 56 | 88 | 144 | 176 | 208 | 224 | 256 | 336 |
| TBS_indicator \ I_TBS | 8 | 9 | 10 | 11 | 12 | 13 | 14 | 15 |
| TBS_indicator = 0 | 256 | 304 | 336 | 384 | 456 | 504 | 552 | 608 |
| TBS_indicator = 1 | 408 | 456 | 504 | 608 | 704 | 768 | 848 | 928 |
| TBS_indicator \ I_TBS | 16 | 17 | 18 | 19 | 20 | 21 | 22 | 23 |
| TBS_indicator = 0 | 640 | 704 | 808 | 848 | 928 | 1032 | 1064 | 1128 |
| TBS_indicator = 1 | 984 | 1064 | 1160 | 1288 | 1416 | 1480 | 1608 | 1736 |
| TBS_indicator \ I_TBS | 24 | 25 | 26 | 27 | 28 | 29 | 30 | 31 |
| TBS_indicator = 0 | 1192 | 1256 | 1480 | 1672 | 1800 | 2024 | 2216 | 2472 |
| TBS_indicator = 1 | 1800 | 1864 | 2216 | 2472 | 2792 | 3104 | 3368 | 3824 |

1000

(56) References Cited

U.S. PATENT DOCUMENTS

| | | | |
|---|---|---|---|
| 2013/0083753 A1* | 4/2013 | Lee | H04W 72/0453 370/329 |
| 2014/0056188 A1* | 2/2014 | Yang | H04L 27/2656 370/280 |
| 2014/0161110 A1* | 6/2014 | Kim | H04L 5/001 370/336 |
| 2017/0171841 A1* | 6/2017 | Chen | H04L 5/0007 |
| 2018/0041857 A1* | 2/2018 | Ouchi | H04W 72/04 |
| 2018/0049006 A1* | 2/2018 | Hong | H04L 69/28 |
| 2018/0152924 A1* | 5/2018 | Ouchi | H04W 72/042 |
| 2018/0206080 A1* | 7/2018 | Chen | H04W 4/50 |
| 2019/0141679 A1* | 5/2019 | He | H04L 5/0007 |
| 2019/0208436 A1* | 7/2019 | Zhou | H04L 1/0003 |
| 2019/0223197 A1* | 7/2019 | Shin | H04L 1/0031 |
| 2020/0015272 A1* | 1/2020 | Lee | H04W 72/042 |
| 2020/0022156 A1* | 1/2020 | Kim | H04L 5/0007 |
| 2020/0187170 A1* | 6/2020 | Shin | H04W 28/06 |

* cited by examiner

| Message type | RNTI value | Where message is carried |
|---|---|---|
| Direct indication | P-RNTI, flag = 0 | PDCCH |
| Paging | P-RNTI, flag = 1 | PDSCH |
| SC-M/CCH change | SC-RNTI | PDSCH |
| SIB | SI-RNTI | PDSCH |
| RAR | RA-RNTI | PDSCH |

802 — VRB-to-PRB mapping – 0 or 1 bit, only applicable to resource allocation type 1, as defined in section xxx of [4, TS38.211].

-0 bit if only resource allocation type 0 is configured;

-1 bit otherwise.

-Frequency hopping flag – 0 or 1 bit, only applicable to resource allocation type 1, as defined in section xxx of [6, TS38.214].

-0 bit if only resource allocation type 0 is configured;

-1 bit otherwise.

902 — For the PDSCH assigned by a PDCCH with DCI format 1_0/1_1 with CRC scrambled by C-RNTI, if the higher layer parameter *MCS-Table-PDSCH* is set to '256QAM' is configured and ≤ IMCS≤27, or the higher layer parameter *MCS-Table-PDSCH* is not set to '256QAM' configured and ≤ IMCS≤28, the UE shall first determine the TBS as specified below:

FIG. 9

TBS_TABLE_1_0 ⟵ 1000

| TBS indicator_I_TBS | 0 | 1 | 2 | 3 | 4 | 5 | 6 | 7 |
|---|---|---|---|---|---|---|---|---|
| TBS_indicator = 0 | 32 | 56 | 72 | 104 | 120 | 144 | 176 | 224 |
| TBS_indicator = 1 | 56 | 88 | 144 | 176 | 208 | 224 | 256 | 336 |
| TBS indicator_I_TBS | 8 | 9 | 10 | 11 | 12 | 13 | 14 | 15 |
| TBS_indicator = 0 | 256 | 304 | 336 | 384 | 456 | 504 | 552 | 608 |
| TBS_indicator = 1 | 408 | 456 | 504 | 608 | 704 | 768 | 848 | 928 |
| TBS indicator_I_TBS | 16 | 17 | 18 | 19 | 20 | 21 | 22 | 23 |
| TBS_indicator = 0 | 640 | 704 | 808 | 848 | 928 | 1032 | 1064 | 1128 |
| TBS_indicator = 1 | 984 | 1064 | 1160 | 1288 | 1416 | 1480 | 1608 | 1736 |
| TBS indicator_I_TBS | 24 | 25 | 26 | 27 | 28 | 29 | 30 | 31 |
| TBS_indicator = 0 | 1192 | 1256 | 1480 | 1672 | 1800 | 2024 | 2216 | 2472 |
| TBS_indicator = 1 | 1800 | 1864 | 2216 | 2472 | 2792 | 3104 | 3368 | 3824 |

FIG. 10

Table 4.5.1.1-1: Range 1 NR UE and BS maximum RB allocation for CP-OFDM

| SCS [kHz] | Channel bandwidths [MHz] | | | | | | | | | |
|---|---|---|---|---|---|---|---|---|---|---|
| | 5 | 10 | 15 | 20 | 25 | 40 | 50 | 60 | 80 | 100 |
| 15 | 25 | 52 | 79 | 106 | 133 | 216 | 270 | N.A | N.A | N.A |
| 30 | 11 | 24 | 38 | 51 | 65 | 106 | 133 | 162 | 217 | 273 |
| 60 | N.A | 11 | 18 | 24 | 31 | 51 | 65 | 79 | 107 | 135 |

Table 1200:

| Allocation | 275 PRBs | | | | 273 PRBs | | | |
|---|---|---|---|---|---|---|---|---|
| layers | 1 | 1 | 1 | 1 | 1 | 1 | 1 | 1 |
| Qm | 2 | 4 | 6 | 8 | 2 | 4 | 6 | 8 |
| C (code blocks) | 7 | 13 | 26 | 36 | 7 | 12 | 25 | 36 |
| TBS | 52224 | 102416 | 213176 | 295176 | 52224 | 100392 | 208976 | 295176 |
| layers | 2 | 2 | 2 | 2 | 2 | 2 | 2 | 2 |
| Qm | 2 | 4 | 6 | 8 | 2 | 4 | 6 | 8 |
| C (code blocks) | 13 | 25 | 51 | 71 | 13 | 24 | 50 | 71 |
| TBS | 104496 | 204976 | 426336 | 590128 | 104496 | 200808 | 417976 | 590128 |
| layers | 4 | 4 | 4 | 4 | 4 | 4 | 4 | 4 |
| Qm | 2 | 4 | 6 | 8 | 2 | 4 | 6 | 8 |
| C (code blocks) | 25 | 49 | 102 | 141 | 25 | 48 | 100 | 141 |
| TBS | 208976 | 409616 | 852696 | 1179864 | 208976 | 401640 | 835976 | 1179864 |

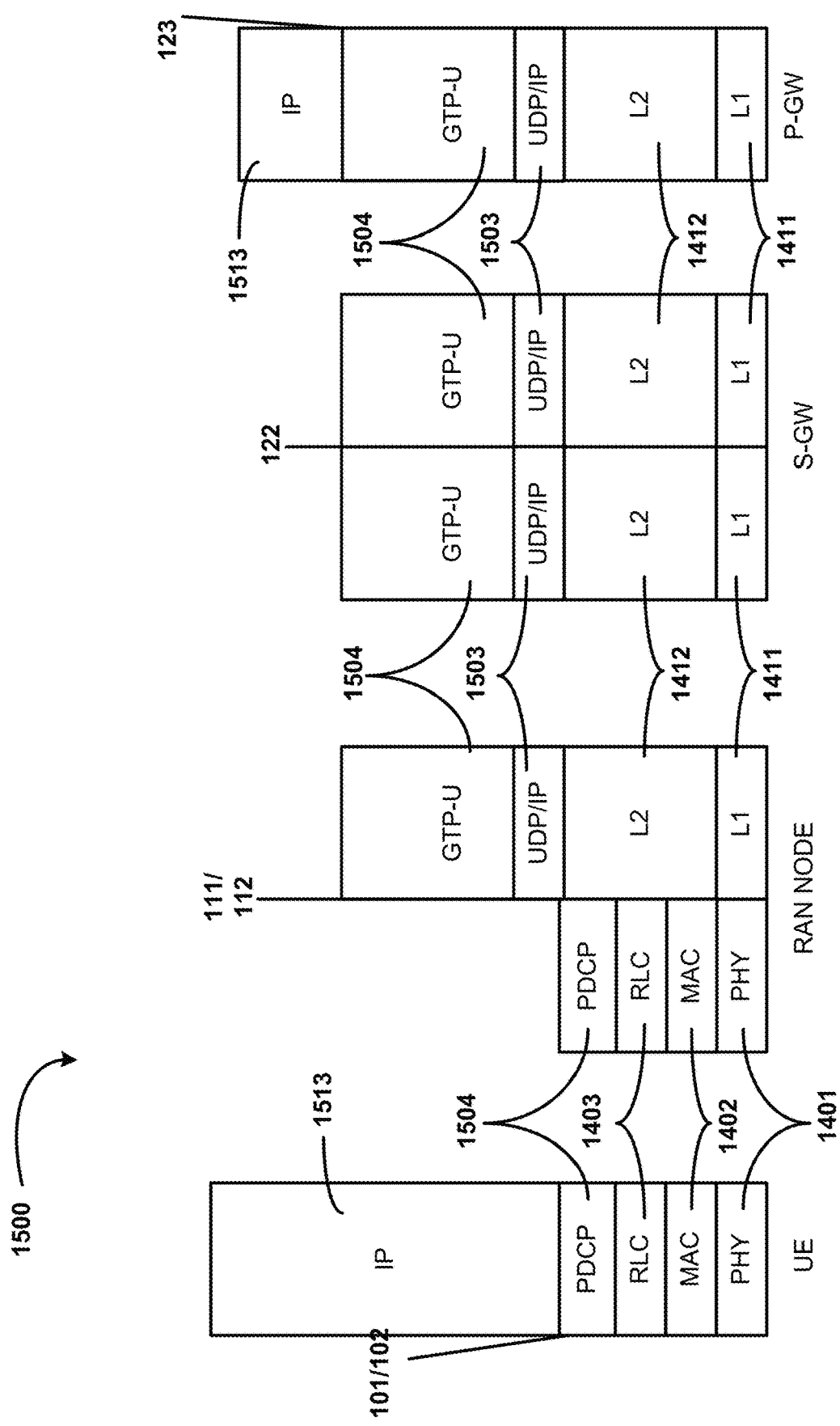

TRANSMISSION DOWNLINK CONTROL INFORMATION FOR NEW RADIO (NR) SYSTEM

REFERENCE TO RELATED APPLICATIONS

This application claims the benefit of U.S. Provisional Application No. 62/617,109 filed Jan. 12, 2018, entitled "TRANSMISSION DOWNLINK CONTROL INFORMATION FOR NEW RADIO (NR) SYSTEM", the contents of which are herein incorporated by reference in their entirety.

FIELD

The present disclosure relates to wireless technology, and more specifically to techniques for downlink (DL) control information (DCI) for new radio (NR) systems or network devices of an NR network.

BACKGROUND

For New Radio (NR), downlink control information (DCI) formats handle different control signaling messages, e.g., downlink shared channel (DL-SCH) scheduling assignments, uplink shared channel (UL-SCH) scheduling grants as well as paging, random access response (RAR) and system information. A user equipment (UE) may perform blind decoding (BD) on all combinations of physical downlink control channel (PDCCH) formats and locations. The number BDs linearly increases with the number of DCI format sizes. Given limited battery resources at the UE, it is desirable to limit the number of different DCI payload sizes for NR so as to reduce the overall number of BDs and test cases; on the contrary, an excessive reduction to a small number of payload sizes causes a larger PDCCH overhead by padding. As such, there is a need to design respective PDCCH format contents, taking into account the relevant design factors and several important aspects including reducing the BDs and padding for efficient power saving and resources.

BRIEF DESCRIPTION OF THE DRAWINGS

FIG. 7 is a diagram illustrating an example of a mapping between an information message type and corresponding radio network temporary identifier (RNTI) value for a compact DCI format according to various aspects discussed herein.

FIG. 8 is a diagram illustrating an example of a DCI format including a set of bit fields, according to various aspects discussed herein.

FIG. 9 is a diagram illustrating an example of a DCI format including a set of data for TBS size determination according to various aspects discussed herein.

FIG. 10 is a diagram illustrating an example a TBS table according to various aspects discussed herein.

FIG. 11 is a diagram illustrating another example a TBS table of a DCI format, according to various aspects discussed herein.

FIG. 12 is a diagram illustrating another example a TBS table of a DCI format, according to various aspects discussed herein.

FIG. 15 illustrates user plane protocol stack that can be implemented for operation of various embodiments and aspects described herein.

DETAILED DESCRIPTION

Figure 1:
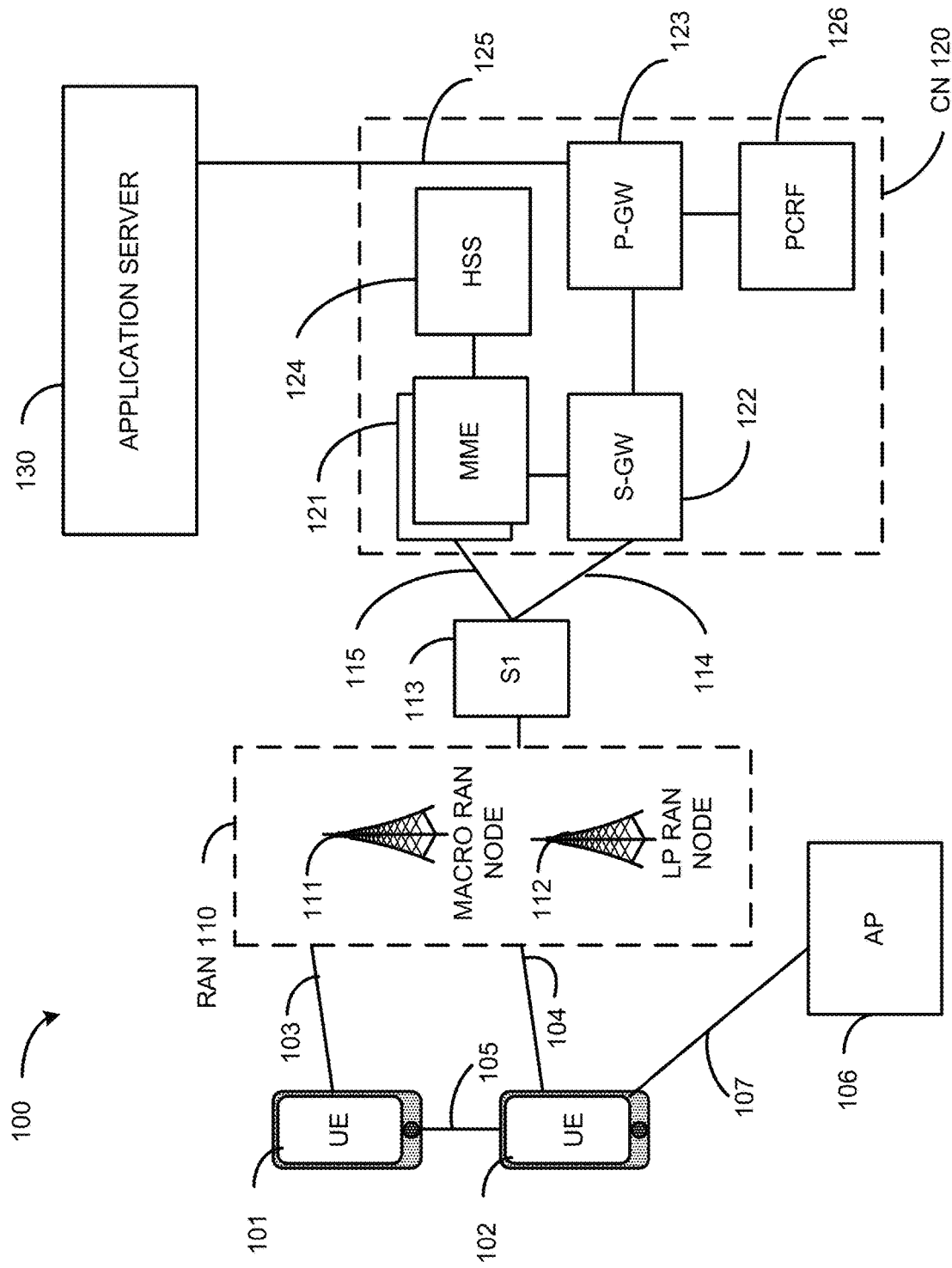
FIG. 1 is a block diagram illustrating an example user equipments (UEs) or Vehicle (V) or Vehicle-to-Everything (V2X) device in a network with network components useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of various deficiencies or solutions described herein, the present disclosure provides various embodiments for the Downlink Control Information (DCI) formats used for paging information, System Information Block (SIB), Single Cell (SC)-Multicast Control Channel (MCCH) (SC-MCCH) change, and Random Access Response (RAR) to minimize the payload while still provide improved power consumption for blind decoding and flexible resource allocations. In addition, some approaches to restricting the transport block size (TBS) for paging, SIBs, etc., are configured to further reduce the DCI payload. Certain aspects of the present disclosure relate to techniques for DCI design to reduce the decoding complexity and signaling overhead for 5G new radio (NR) devices for NR communications over a network.

In an aspect, NR devices such as 5G new radio base stations or gNBs along with UEs communicatively coupled thereto can be configured to generate and process a DCI transmission based on a compact DCI format for reduced signaling overhead, wherein the compact DCI format comprises a grouped broadcast message that comprises at least two information types of: a random access response (RAR) message, a paging message, a system information block (SIB) message, or a single cell (SC) multicast control channel (SC-MCCH) change. As such, each of these information types can be combined within a single compact DCI format of a DCI transmission to reduce blind decoding attempts (BDs) and communication overhead for NR communications. A radio frequency (RF) interface of the device can then be configured to provide, to RF circuitry, data for processing the DCI transmission based on the compact DCI format.

In other aspects, an NR device can be configured to distinguish between a direct indication message that includes paging information only in a physical downlink control channel (PDCCH) and both in the PDCCH and a physical downlink shared channel (PDSCH) based on a flag field of the DCI transmission. The direct indication message can refer to paging information being provided only in the PDCCH, without paging information in the PDSCH. The flag field can comprise a number of X bits. Further, the compact DCI format of the direct indication message can be configured based on a same size and a same paging radio network temporary identifier (P-RNTI) for cyclic redundancy check (CRC) scrambling as the DCI format scheduling the paging message on the PDSCH, by padding the compact DCI format with reserve information bits.

Additional aspects and details of the disclosure further described below with reference to figures.

Embodiments described herein can be implemented into a system or network device using any suitably configured hardware and/or software. FIG. 1 illustrates an architecture of a system 100 of a network in accordance with some embodiments. The system 100 is illustrated to include a UE 101 and a UE 102, which can further represent new radio (NR) devices as discussed herein.

In embodiments or aspects, any one or more of the UEs 101 and 102 can comprise a vehicular/drone/Internet of Things (IoT) UE device or IoT device, which can comprise a network access layer. These devices can also utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, communicatively couple, or operably couple with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, as well as vehicle network nodes including V2X nodes or the like. They can be referred to as RAN nodes herein and also comprise ground stations (e.g., terrestrial access points) or satellite stations providing coverage within a geographic area (e.g., a cell). The RAN 110 can thus include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It can also inform the UEs 101 and 102 about the transport format, resource allocation, and Hybrid Automatic Repeat Request (H-ARQ) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, 8, 16).

Some embodiments can use concepts for resource allocation for control channel information that are an extension of the above-described concepts. For example, some embodiments can utilize an enhanced physical downlink control channel (EPDCCH (or ePDCCH)) that uses PDSCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the EPC network 123 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
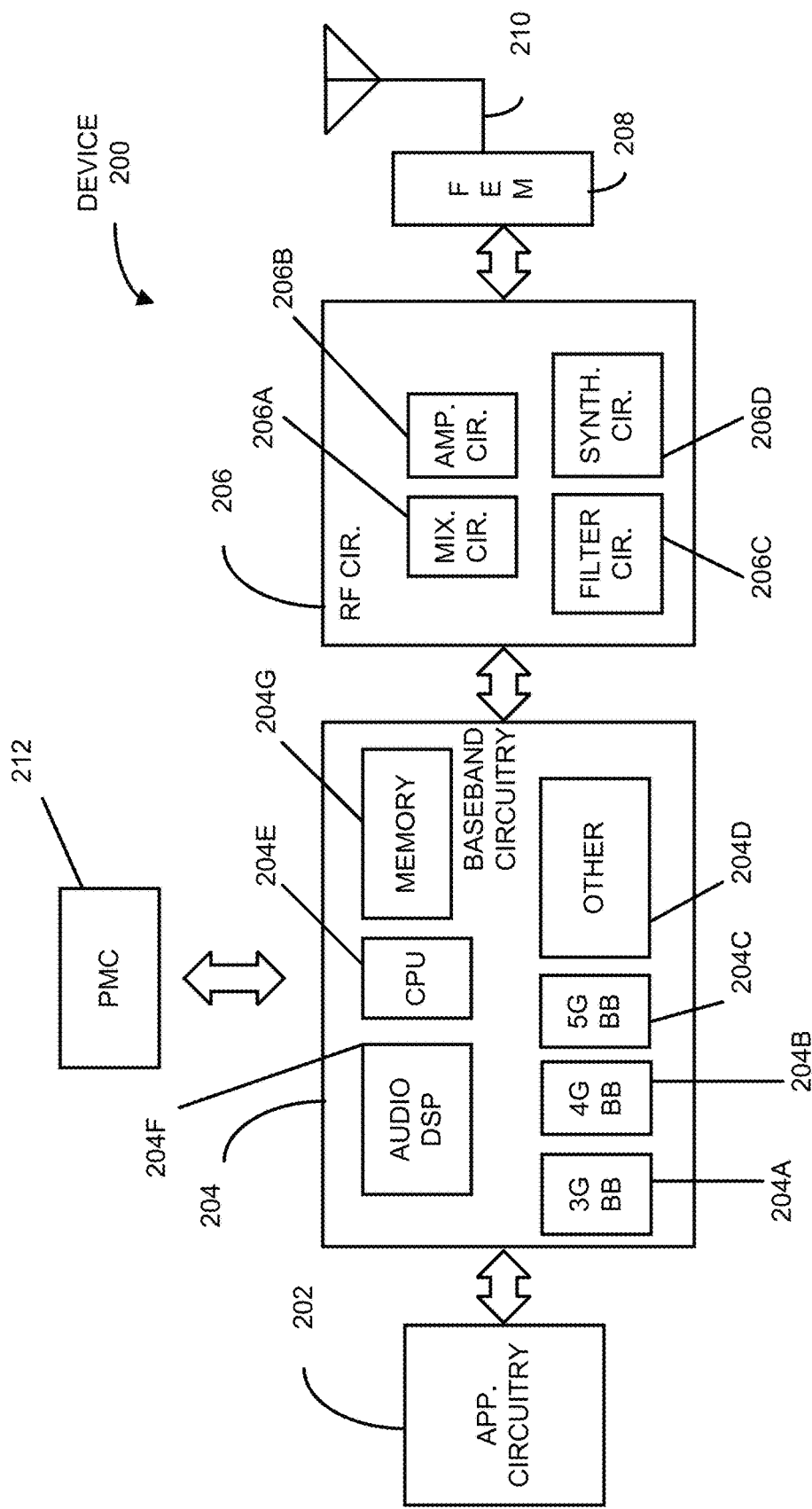
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101/102, or eNB/gNB 111/112. In some embodiments, the device 200 can include less elements (e.g., a RAN node can not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

Figure 4:
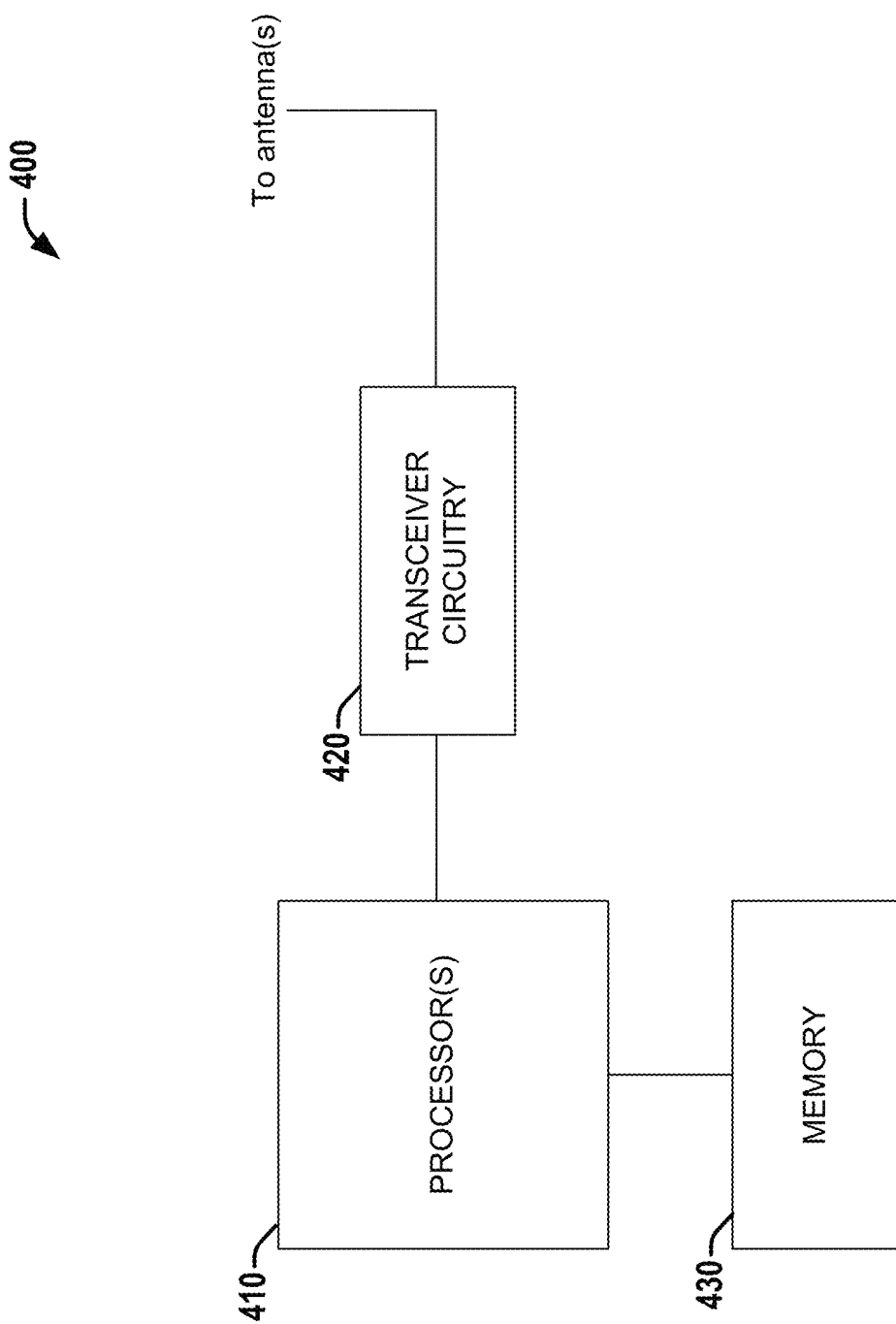
FIG. 4 is a block diagram illustrating a system employable at a UE that facilitates DCI transmission, according to various aspects described herein.
Figure 5:
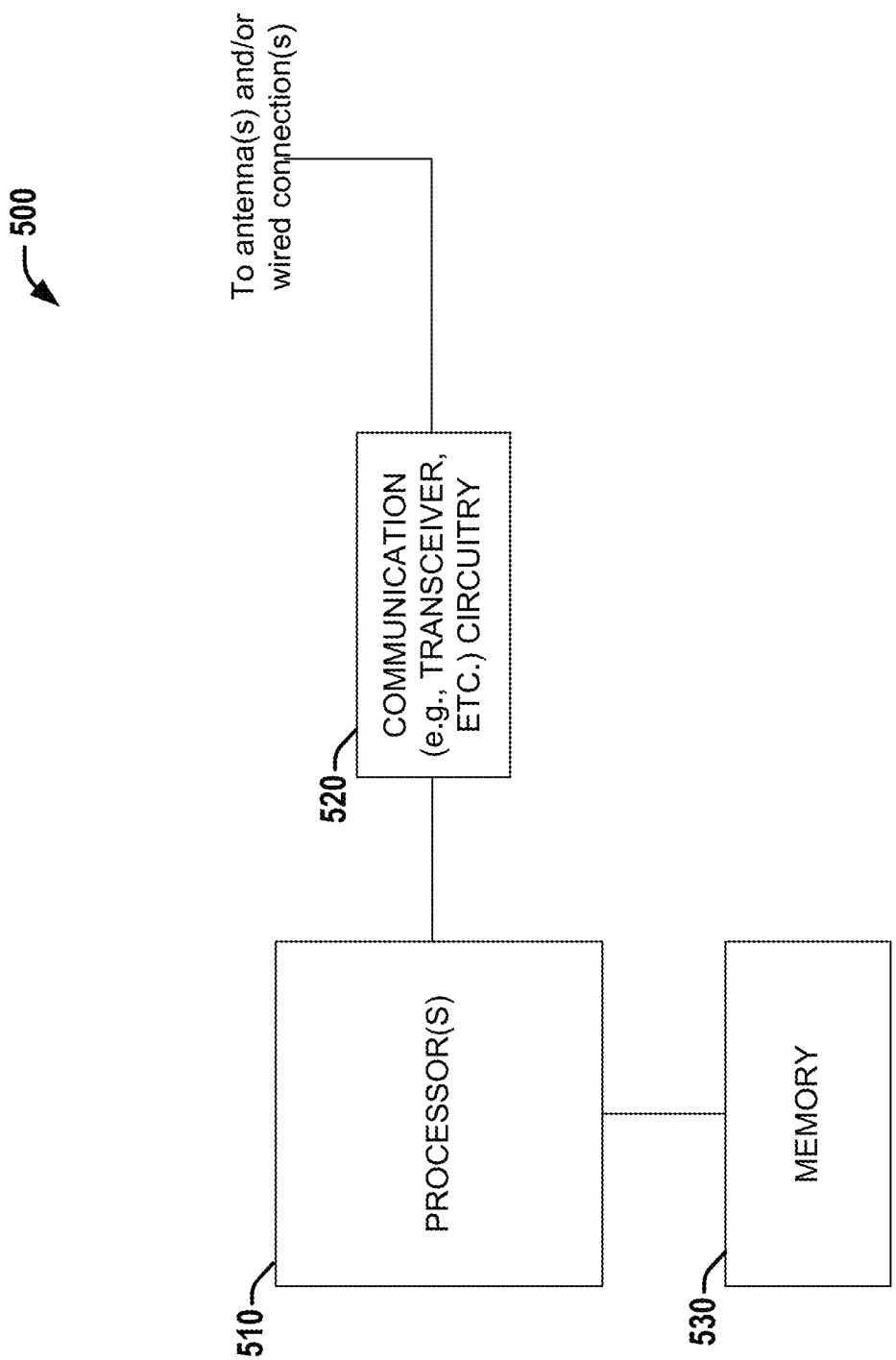
FIG. 5 is a block diagram illustrating a system employable at a BS (Base Station) that facilitates DCI transmissions according to various aspects described herein.

In addition, the memory 204G (as well as other memory components discussed herein, e.g., memory 430 of FIG. 4, memory 530 of FIG. 5 or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used to execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
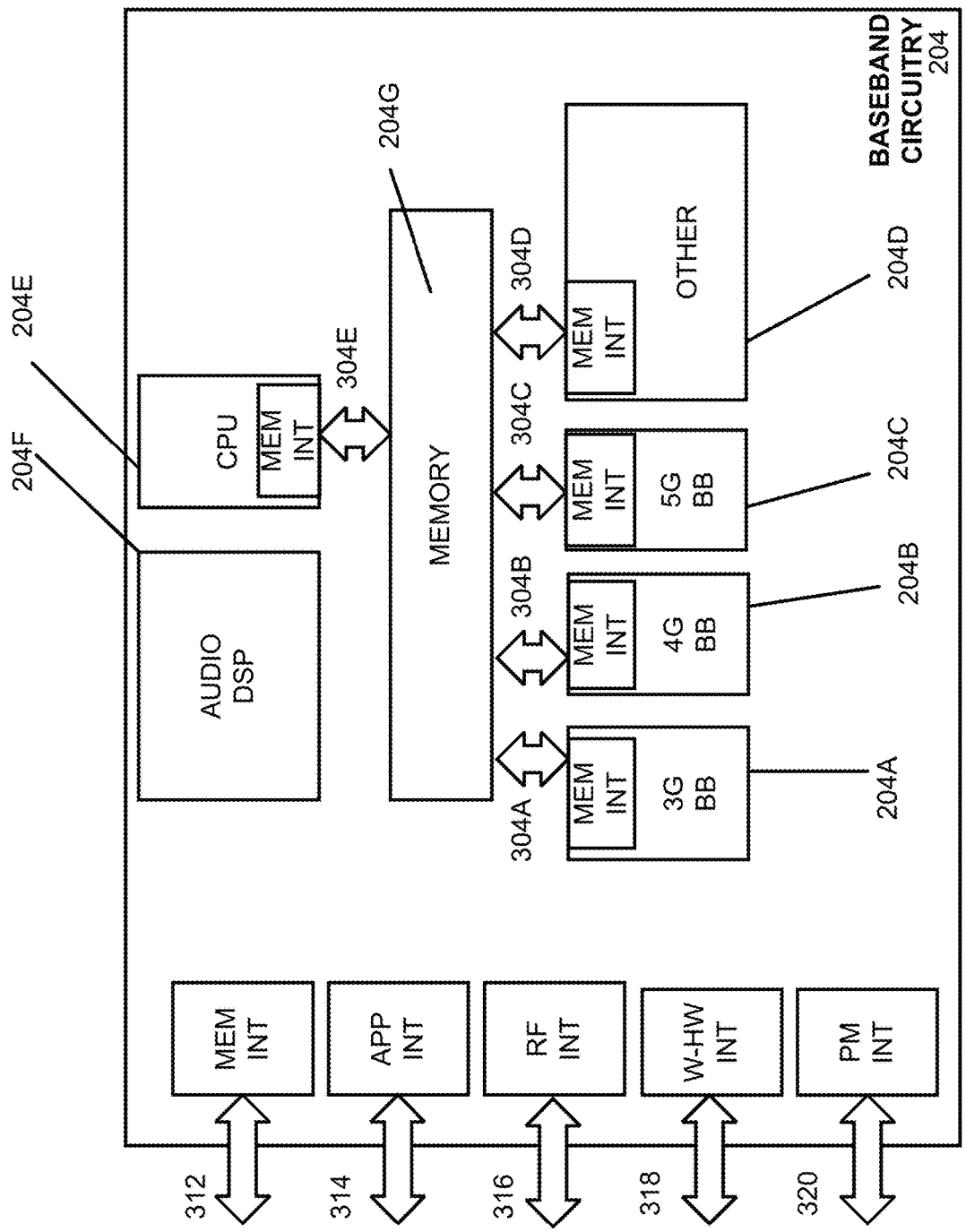
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Referring to FIG. 4, illustrated is a block diagram of a system/device 400 employable at a UE or other network device (e.g., UE 101/102) that facilitates DCI configurations to reduce the decoding complexity and signaling overhead for 5G NR devices as UE 101/102, for example. System 400 can include one or more processors 410 (e.g., one or more baseband processors such as one or more of the baseband processors discussed in connection with FIG. 2 and/or FIG. 3) comprising processing circuitry and associated interface (s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420).

In various aspects, system 400 can be included within a user equipment (UE). As described in greater detail below, system 400 can facilitate configuration of or process a downlink control information (DCI) transmission based on a compact DCI format for reduced signaling overhead. The compact DCI format can include a grouped broadcast message that comprises different information types according to the following: vat least two information types of: a random access response (RAR) message, a paging message, or a system information block (SIB) message, scheduling of one PDSCH codeword carrying Single Cell-MCCH (SC-MCCH) in one cell, or a notifying SC-MCCH change message.

For example, the grouped message can be a broadcast message comprising the information types including at least two of: the RAR message, the paging message or the SIB message. The SC-MCCH change message or scheduling of one PDSCH code word carrying the SC-MCCH can also be included in the information types of the same grouped broadcast message, for example. The RF interface can be configured to provide (e.g., to RF circuitry) data for processing the DCI transmission based on the compact DCI format.

In an aspect, the UE device or NR device 400 can distinguish between a direct indication message that includes paging information only in a physical downlink control channel (PDCCH) and both in the PDCCH and a physical downlink shared channel (PDSCH) based on a flag field of the DCI transmission. For example, a bit flag (e.g., two bits or more) can indicate that paging information is provided by a direct indication, where the paging information message is only in the PDCCH. The bit flag can alternatively indicate that the paging information is provided in the PDCCH and the PDSCH, in which the PDCCH can comprise the scheduling of the paging information that is in the PDSCH, for example.

The direct indication message can thus indicate that a short paging information (e.g., as shorter than standard paging in both PDCCH and PDSCH) is provided or fit in the DCI format or compact DCI format without a need for the PDSCH transmission. The short paging information can comprise emergency message(s) or an system information SI updated indication (e.g., systemInfoModification, commercial mobile alert system (cmas)-Indication, or earthquake tsunami warning system (etws)-indication).

In another aspect, the UE device 400 can determine the information types of the DCI transmission based on a dedicated radio network temporary identifier (RNTI) value, or based on an X-bit identifier information element (IE) in the compact DCI format, wherein X is an integer equal to or greater than one. As such, the information types from among the grouped broadcast message can be distinguished according to a dedicated radio network temporary identifier (RNTI) value. For example, the dedicated RNTI value can indicate whether the RAR message, the paging message or the SIB message is included in the grouped broadcast message.

In an example, the DCI format of the compact DCI format used for scheduling the PDSCH to convey RAR, Paging, SIBs and SC-MCCH change messages can be distinguished by dedicated RNTI values. The dedicated RNTI values, for example, can be assigned or signaled by one or more higher layers for each respective message. Alternatively, or additionally, a one-to-one mapping can be processed between the X-bit "identifier for DCI formats" IE states and the corresponding message (information) type be configured by higher layers.

The RNTI value(s) can be implicitly encoded with scrambling CRC parity bits of the DCI format (or compact DCI format with reduced bits relative to standard release 15 DCI format(s) of NR systems) with scrambling CRC parity bits by a XOR operation or an exclusive OR operation (e.g., with two inputs and one output). In an aspect, the DCI format (of the compact DCI format) for the direct indication message can have a same size and use a same P-RNTI for CRC scrambling as a DCI format scheduling the paging information transmission on PDSCH, which can be distinguished by a 1-bit flag or identifier for DCI formats IE in the compact DCI format.

For the SC-MCCH, for example, the UE can process an indication in an IE of a SC-MCCH change of a next period. Thus, the DCI format for an SC-MCCH change that the CRC scrambled by an SC-RNTI can include a bit indication (e.g., a 1 bit) information element (IE) for the SC-MCCH change notification.

In another aspect, the UE device can process the compact DCI format of a direct indication message based on padded reserve information bits that ensure the compact DCI format comprises a same size as a DCI format scheduling the paging message on the PDSCH.

Referring to FIG. 5, illustrated is a block diagram of a system 500 employable at a Base Station (BS), eNB, gNB or other network device (e.g., aV2X node as eNB/gNB 111/112) that can enable generation and processing of configurable search spaces and related resources (e.g., times, time instances, CCEs, aggregation levels, or the like) for one or more UEs (e.g., URLLC UEs, or non-URLLC UEs) according to various aspects described herein. System 500 can include one or more processors 510 (e.g., one or more baseband processors such as one or more of the baseband processors discussed in connection with FIG. 2 and/or FIG. 3) comprising processing circuitry and associated interface (s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture.

As described in greater detail below, system 500 (e.g., NR or gNB) can facilitate configuration of NR communications comprising a DCI format that schedules a PDSCH comprising the grouped broadcast message including at least two of: a random access response (RAR) message, a paging message, a system information block (SIB) message, an SC-MCCH change message corresponding to a plurality of UEs for reducing signaling overhead. Processing circuitry, for example or one or more processors of the device 500 can generate a flag field that distinguishes between a direct indication message with paging information located only in a PDCCH and also further in the PDSCH.

For example, the device or system 500 can generate the compact DCI format in a DCI message with paging information that is only in the PDCCH or both in the PDCCH and the PDSCH. The NR DCI communication can indicate whether it is a direct indication or paging in the PDSCH from the DCI based on a flag field. The flag field can comprise a two-bit flag or larger bits (e.g., X-bit, X being an integer greater than one), for example. The direct indication can short paging information in the compact DCI format without an association to the PDSCH, in which the short paging information can be an emergency message or a system information updated indication.

In one embodiment of the device 500, the compact DCI format of the direct indication message can be generated, changed or varied based on a same size and a same P-RNTI for CRC scrambling as a DCI format scheduling the paging message on the PDSCH by padding the compact DCI format with reserve information bits. A varying of a size of a compact DCI payload and the flag field among the NR communications can be based on a change of information in the grouped broadcast message including at least two of: the RAR message, the paging message, the SIB message, or a single cell SC-MCCH change.

In another embodiment, the DCI transmission can be based on the compact DCI format according to a subset of control channel element (CCE) aggregation levels from a larger set of CCE aggregation levels, or a reduced number of blind decoding candidates associated with other CCE aggregation levels than the subset of CCE aggregation levels. For example, the subset can be only three aggregation levels out of four/five levels, such as aggregation level 4, 8 and 16, or another subset of about two to three aggregation levels out of four or five aggregation levels. The aggregation levels can be referenced at TS 213 Release 15 (v.15.1) Section 10, and Table 10.1-1, for example.

Figure 6:
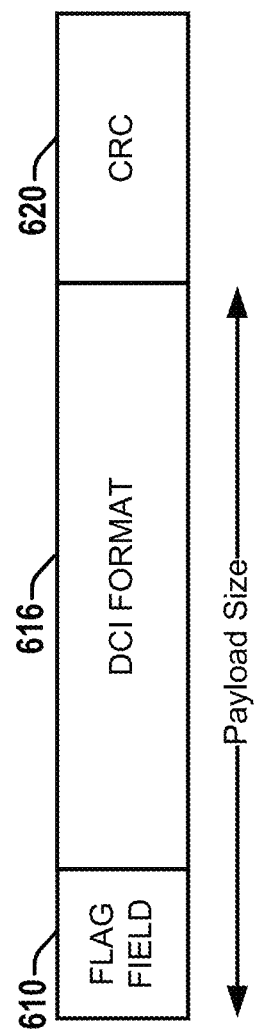
FIG. 6 is a block diagram illustrating a compact DCI format configuration according to various aspects discussed herein.

FIG. 6 is a diagram illustrating a DCI communication 600 for NR communications. The DCI 600 can include a flag field 610 and a DCI format 616 comprising the payload with the cyclic redundancy check (CRC) bits 620.

In NR systems and communications, each PDCCH follows a DCI format. DL DCI formats may include DCI formats 1-0 and DCI format 1_1. Uplink (UL) DCI formats may include DCI format 0-0 and 0-1. In addition, DCI format 2_0, 2_1, 2_2 and 2_3 are defined for notifying the slot format, reserved resources where UE may assume no transmission intended for the UE, transmit power control (TPC) commands for PUCCH and PUSCH and group TPC commands for sounding reference signal (SRS) respectively. DCI formats can be characterized by the target downlink (DL) and can be generalized as DCI format X_Y where X represents, for example the DL coupling, and Y the uplink (UL) for example. A smaller format number (e.g., in uplink) can represent a smaller payload size, in which a scheduling flexibility can be used according to the variations in the DCI format.

The payload size could be varied depending on what kind of information to be transmitted to a UE. As such, an x-bit flag of the Flag field 610 can be used to dynamically vary the payload size after the gNB (e.g., gNB 500) generates indicates whether message information (e.g., the paging message) can either put directly in the PDCCH, or put also in the PDSCH when the payload is large or above a predefined threshold. For example, the flag can be a one bit, or greater than one bit (e.g., two bits or more). As such, flag field 610 with the bit flag gives flexibility to directly generate the paging with only PDCCH and sometimes, put the message in PDSCH, in which the UE knows this based on the x bit flag of the flag field 610. This flag field 610 can thus provide the bit flag to distinguish a direct indication (e.g., paging information only in the PDCCH) or the paging in the PDSCH as scheduled by the PDCCH, for example.

RAR, Paging and SIB(s) can have a relatively small amount of information bits for multiple UEs (e.g., in a broadcast message), and hence can be grouped into a same PDSCH to improve resource efficiency. In an aspect, maintaining a same size as one of DCI formats for RAR, Paging and SIBs can result in signaling overhead and small cell coverage. As such, certain aspects/embodiments herein can reduce the signaling overhead (DCI format size) for a compact DCI format, and at the same time minimize the power consumption of PDCCH monitoring for receiving RAR, Paging and SIB messages.

In another aspect, the gNB 500, for example, can minimize the DCI with a compact DCI format and deliver a grouped broadcast message as two or more messages, including: the RAR, the paging, the SIB messages, for example, as well as potentially an SC-MCCH change notification or a scheduling of one PDSCH codeword carrying an SC-MCCH in one cell. To accommodate such dynamic change between DCI, an indication can be generated in the DCI for the UE 400 to determine the information messages in the grouped message, for example.

According to certain aspects, a compact DCI format (e.g., DCI format 1_2, or DCI format 1_1, or DCI format X_Y) for example can be defined, which can be used for paging messages, scheduling of one PDSCH codeword carrying SC-MCCH in one cell, notifying SC-MCCH change message, RAR messages as well as SIB messages. These different messages that are scheduled by or in a compact DCI format can be distinguished by a dedicated RNTI value 620 that is implicitly encoded in the CRC 620 of the compact DCI format 600.

In an example, CRC parity bits with DCI format 1_2, 1_1, or otherwise as denoted X_Y) can be scrambled by an exclusive OR (XOR operation) with the corresponding RNTI based on the information message type (e.g., RAR, paging, SIB, SC-MCCH change, etc.) or a combination of information types in a grouped broadcast message of a DCI 600. In some other designs, an X-bit "Identifier for DCI formats" information element (IE) can be included in DCI format payload 616 to indicate the corresponding messages (of the grouped broadcast message of the DCI).

Referring briefly to FIG. 7, illustrated is a table 700 in a memory or processor demonstrating a mapping between an information message type and a corresponding RTNI value for a DCI format. For example, the memory can be the memory 204G, 430 or 530 detailed above, or a different memory external or in a processing circuitry (e.g., baseband circuitry 204, 410 or 510).

In one embodiment, a 3-bit information field (IE), value "000" can indicate direct indication; value "001", for example, can indicate paging message with PDSCH; value "010" can indicate an SC-MCCH change notification; value "011" can indicate SIB information; value "100" can indicate a RAR message; other remaining states can be reserved for future releases, for example. Other formats can be predefined, other than the example given with respect to bit values and the predefined mapping of message type and corresponding RNTI value here, for example. A fixed DCI format size can thus be defined regardless of the message type it schedules to avoid increasing blind decoding times or BD attempts.

In an aspect, the compact DCI format of the direct indication message can be generated, changed or varied based on a same size and a same paging RNTI (P-RNTI) for CRC scrambling as a DCI format scheduling the paging message on the PDSCH by padding the compact DCI format with reserve information bits. An SC-RNTI can be used for the SC-MCCH change, a system information RNTI can be used for the SIB message, and a random access (RA) RNTI (RA-RNTI) can be used for the RAR message. As such, various RNTIs (e.g., RNTI 1, RNTI 2, RNTI 3, or the like) can be used to scramble the CRC and indicate the information types in a grouped broadcast message. The UE 400 can then decode the DCI, obtain the CRC, perform a parity check to determine which RNTI is used after decoding the CRC in the DCI format, and determine the RNTI being used for determining the associated messages. Different RNTI values can also be associated with the different message while using a same DCI format. A varying of a size of a compact DCI payload and the flag field among the NR communications can be based on a change of information in the grouped broadcast message including at least two of: the RAR message, the paging message, the SIB message, or a SC-MCCH change, for example.

Table 700 specifies the mapping of the DL message type to their corresponding RNTI value 620 of FIG. 6. Paging information is short in some cases and can fit in the DCI format (e.g., a compact DCI format) transmission without utilizing the PDSCH, e.g. emergency messages or SI updated indication. This could be beneficial in terms of resource efficiency and reducing the latency of paging reception, for example.

In certain aspects, to support this feature, short paging messages (referred to as "direct indication" in Table 700) can be directly encoded in the DCI format content e.g. in case of systemInfoModification, cmas-Indication, or etws-Indication. As the DCI format for "direct indication" can be assumed to have a same size and use a same P-RNTI for CRC scrambling as a DCI format scheduling a paging transmission. In some embodiments, the DCI format can includes a bit flag 610 (e.g., one bit, two bits, or more), or "Identifier for DCI formats" IE, which services to indicate the DCI format 615 being used for "direct indication" or scheduling a PDSCH transmission to convey paging.

In other aspects, if the size of the DCI format for direct indication and paging is not identical, reserve information bits can be added in a padding operation by the gNB 500 to the smaller DCI format until the size is equal. Using the compact DCI format (e.g., DCI format 1_1) for direct indication could result in a large overhead for scheduling other message in Table 1 with the PDSCH transmission, e.g. paging, SIB and RAR message. To address this problem, one configuration of the DCI could include to define another DCI format 1_3 and encoding direct indication in the DCI payload. The size of DCI format 1_3 is different with that of DCI format 1_2, for example, as well as other formats notations of X_Y could also be used. As such, different messaging types could have a different payload of the DCI. To align the DCI format across DCI communications, padding can be done with reserve information bits, such as when the direct indication message is being generated in response to only using PDCCH for the paging message, where the PDSCH could be padded as well. In some cases an additional DCI format (e.g., DCI format 1_2 could be defined).

In other embodiments, the DCI contents for different message transmissions be predefined or specified. For example, a DCI format for one or more of: paging, SIB, SC-MCCH change or RAR can include following information elements (IEs): i. Frequency domain resource assignment; ii. Time domain resource assignment; and a Modulation and coding scheme (MCS).

In another embodiment, the DCI format for paging, SIB, RAR and SC-MCCH change may have limited MCS so as to reduce size of MCS IE compared to the MCS IE in other NR DCI formats. For example, only quadrature phase shift keying (QPSK) along with a limited set of possible coding rate (hence a relatively limited of transport block sizes (TBS)) could be supported or configured for PDSCH to convey Paging, RAR and SIB message. More specifically, a QPSK could only be supported as a limited MCS with a limited set of possible coding rate. Thus, the gNB can limit this TBS from 5 bits to 3 bits in size, allowing two bits in overhead reduction.

In other aspects, the time domain resource assignment for the compact DCI format can support a limited resource assignment granularity in a time domain for further bit saving or reduction. The DCI transmission generated could only support a slot-based resource assignment in time. For example, up to 2 bits could be sufficient to support up to four combinations of possibilities of duration and offset, which could lead to a saving of 4 bits in the compact DCI format compared to other DCI formats. In some other configurations, both slot-based and non-slot-based PDSCH transmission can be configured for use, taking into account the latency advantage of non-slot-based PDSCH transmission for a delay-critical service.

To reduce the DCI format, the candidates of non-slot-based PDSCH transmission scheduled by the compact DCI format can be limited to the duration of 2, 4 or 7 symbols. To facilitate the UE implementation, support of non-slot-based scheduling for paging, SIB, RAR and SC-MCCH change scheduled by the DCI format can be part of UE capability and explicitly configured by radio resource control (RRC) signaling or a higher layer signaling. With this mechanism, the UE blind decoding for paging reception can be avoided for some low cost UEs, or UEs with lower/legacy capability.

In another embodiment, the DCI format for an SC-MCCH change with CRC scrambled by a SC-RNTI can include an X bit IE for SC-MCCH change notification. For example, a one, two or more bit IE can be included. Depending on whether the this channel or the SC-MCCH changes in a next period or not, the X bit IE can indicate this.

In other aspects, a number of the DCI format (e.g., the compact DCI format) for a monitoring and decoding operation can be reduced by supporting or configuring only a subset of Control Channel Element (CCE) aggregation levels, or support of a reduced number of blind decoding candidates for other aggregation levels (e.g., aggregation levels other than the subset). For example, the aggregation levels (AL) of DCI format could be limited to two ALs, e.g. AL 4 or AL 8. The aggregation levels can be referenced at TS 38.213 Section 10, Release 15 or beyond, and at Table 10.1-1, for example.

Advantages for a subset or reduced set of ALs can be in further reducing the DCI payload, such as 20 bits, 25 bits, 30 bits, or more of a reduction. For the UE to reduce a number of blind decoding attempts, there is a direct association with the UE power consumption, also the UE processing as well. In order to reduce the UE power consumption and the UE complexity at the UE side to process the DCI message transmission with compact DCI format, a subset of the CCE aggregation levels or supporting all aggregation levels with a reduced number of blind decoding candidates for other aggregation levels is generated between communications the network devices with a UE 400 or gNB 500. For NR, ALs 1, 2, 4, 8 and 16 can be supported or configured via processors. For the NR broadcast message it could only support or configure three aggregation levels, for example, the four, eight and sixteen ALs, the three largest aggregation levels, for example. Alternatively, a subset of ALs can comprise two, three or four of the supported ALs (e.g., of 1, 2, 4, 8 and 16 AL).

Referring briefly to FIG. 8, illustrated is a set of bit-fields 800 in a memory 802 or processing circuitry in accord with various aspects/embodiments. For example, the memory can be the memory 204G, 430 or 530 detailed above, or a different memory external or in a processing circuitry (e.g., baseband circuitry 204, 410 or 510).

In an embodiment, reducing the size of NR UL grant DCI format (e.g., DCI format 0_0 and 0_1 (e.g., for physical uplink (UL) shared channel (PUSCH) scheduling) can be further generated by defining an IE field in the compact DCI format and conditionally used for virtual resource block (VRB)-to-physical resource block (PRB) mapping and frequency hopping (FH), such as by a single IE field. In particular, NR communication standards enable interleaved or distributed VRB-to-PRB mapping as well as intra- and inter-slot FH for PUSCH resource allocation when resource allocation (RA) type1 is configured.

For VRB-to-PRB mapping for PUSCH, the block interleaver or processor component (e.g., 204 of FIG. 2 or the like) for interleaving can be applied across the entire active UL bandwidth part (BWP). This implies that when the PUSCH resource allocation is less than the span of the UL BWP, the allocated PRB-groups can be discontinuous in frequency. However, in Rel-15, for both CP-OFDM and OFDM with transform precoding, the UE 400 is not expected to support discontinuous allocations in frequency domain. Thus, interleaved VRB-to-PRB mapping can only be used when the PUSCH resource allocation in frequency domain spans the entire UL BWP. On the other hand, FH is a feature used to realize frequency diversity gains when the PUSCH allocation spans a relatively small allocation in frequency domain and is not necessary, when the PUSCH spans the entire UL BWP BW.

Further, it can be seen from the bit-fields 800 of FIG. 8 in the memory 802 that DCI formats 0_0 and 0_1 can include these. Considering the complementary relationship between the two features associated with the set of bit-fields 700 (e.g., FH and VRB-to-PRB mapping), these two DCI fields can be combined into one bit-field 'X' and the UE can determine if the bit-field implies VRB-to-PRB mapping or dynamic enabling/disabling of FH based on the allocated frequency domain resource allocation field.

Thus, in an embodiment, the UE 400, for example can interpret the bit-field 'X' as VRB-to-PRB mapping flag only if it is configured with RA type 1 and the allocated frequency domain resources span the entire UL BWP; otherwise, if the UE 400 is configured with RA type 1 and the allocated frequency domain resources is less than the size of the UL BWP, then the UE interprets the bit-field 'X' as the FH flag.

As such, VRB-to-PRB mapping and frequency hopping flag(s) can be seen as complimentary issues, meaning once one is issued, the other one is narrowly used, because the function is not used simultaneously, but complimentary. This embodiment thus merges the two operations because based on other information, it is already known which field is associated with which one. For example, the frequency domain resource allocation is another field and based on this field value it can be determined if this is a VRB-to-PRB mapping or this is a frequency hopping field, as such one of these two can be selected based on this field information. As such, instead of having two separate fields, the two can be merge into one. For example, the UE can interpret the bit field X as VRB-to-PRB, only if it is a configured resource allocation (RA) and the standard 1 type.

Referring to FIG. 8, illustrated is another example field 800 in a Redundancy Version (RV) format 802 that can be utilized with the described aspects and embodiments herein. The RV field can be within the memory 204G, 430 or 530 detailed above, or a different memory external or in a processing circuitry (e.g., baseband circuitry 204, 410 or 510) according to the various aspects/embodiments described herein.

Redundancy version (RV) can be one or more different versions of redundancy, which can allow a gain in retransmission. In an aspect, the RV can skipped by allowing RV cycling over the current redundancy versions (e.g., RV0 RV1, RV2, RV3). The RV order can be RV0, RV2, RV3, RV1, and the RV for a particular transmission can be determined using a slot index and typing it to a RV value form the cycle e.g. slot index within a transmission window.

For single shot transmissions, for example, such as paging and RA, the RV can be fixed to RV0 or cycle through RV0 and RV3 which are both self-decodable RVs. All of which can be part of the grouped broadcast transmission embodiments/aspects described herein.

Referring to FIG. 9, illustrated is an example transport block size limited to a dedicated RNTI in accord with various aspects herein. The current transport block size (TBS) determination for downlink can be limited to C-RNTI only as illustrated in the information message 900 with information 902.

A TBS determination for common messaging such as SIBs, Paging and RAR is not developed. To this end, embodiments for the RV field format can be configured with the grouped broadcast message or broadcast transmissions with various embodiments/aspects herein.

In an aspect, for LTE, the number of transport block sizes supported for system information (SI)/Paging/RA RNTI can be limited and modulation be limited to QPSK. For example, for LTE DCI 1C, there is an explicit table with TBSs in TS 36.213, with a max TBS=1736, using a five bit field in the DCI for selection. In another example, for LTE 1A, the max TBS is given by 2216 with TBS indication using a 1-bit field indicator for picking from the number of PRBs (N_PRB)=2 or 3 TBS column indicator, and a five bit field for selecting the TBS from the corresponding column.

In an aspect, for NR, a special TBS determination can be configured and supported for SI-RNTI/P-RNTI and RA-RNTI. In particular, the modulation order for these messages can be limited to QPSK only. The TBS, for example, can be explicitly indicated in the DCI and could potentially be delinked from the resource allocation—this allows gNB scheduling freedom in being able to schedule a TB (especially for SI) with flexible MCS. Then, the base graph (BG) determination can follow the existing principle, but it seems easier to assume a predetermined base graph (explicit indication in the DCI or fixed) such as BG2 which is optimized for lower MCS and lower payload sizes, as well as a good fit to SI/P/RA. Segmentation can also be used with BG2 to support payloads larger than 3824.

As such, one embodiment is a network device configuring the payload to 3,824 bits. The motivation is to accommodate new operations for NR because of beam sweeping at high frequency and using a very narrow beam to extend coverage. Thus, when paging occurs a larger number of the UEs can utilize paging in this operation.

For LTE, the paging message can be dimensioned to including approximately 16 paging records, each of ~100 bits, which was sufficient to dimension LTE DCI 1C/1A max payload side. In NR, given the beam-sweep operation, the paging message could be more advantageous to include many more paging records, and hence an increase in the potential payload size could be configured to be a bit larger. Thus, in some embodiments, the maximum payload size could be increased or extended up to about 3824 bits. This can also provide a good container size for configuration of the SI transmission.

Referring to FIG. 10, illustrated is an example TBS table that can be used in accord with aspects/embodiments herein. An example TBS table 1000 (e.g., for format 1_0, or other formats of TBS of a DCI communication) can be configured by the table, where potentially both the TBS_indicator and I_TBS (Transport block size indices numeric vector(s)) can be used or derived from the DCI format (e.g. I_TBS) derived from a bit field (e.g., a five bit field or the like), and TBS-indicator can be explicitly indicated or jointly indicated with one or more fields in the DCI such as resource allocation, etc. The principle is similar to LTE 1A design with an extension of the I_TBS to 32 entries.

In an aspect, a compact DCI format (similar to LTE 1C) can be supported, and then the TBS table 1000 for that format could also be agreed between communications of the network devices (e.g., gNB 500 and UE 400). In some embodiments, the same table (as 1_0) or a subset of the table (e.g. use one TBS_indicator value e.g. TBS_indicator=0) can be reused for compact DCI generation.

In an aspect, the communications can be configured to support separate TBS tables for paging and SI transmission. Thus, it is reasonable to only support a full buffer rate matching (FBRM) for common messaging since the gNB does not necessarily know the capability of the UE to apply any limited buffer rate matching (LBRM).

In an embodiment, a Maximum TB size for a TB scheduled by SI/P/RA RNTI can be 3824 bits.

In an embodiment, for DCI 1_0, the TBS table for SI/P/RA RNTI can be given by the table 1100 of FIG. 11, where TBS_indicator and I_TBS are indicated in the DCI 1_0 at FIG. 10 with TBS_TABLE_1_0_1000, for example.

In an example, the modulation for TBs can scheduled by SI/P/RA RNTI is QPSK.

In another example, Base Graph 2 can be used for TBs scheduled by SVP/RA RNTI.

In another example, FBRM can be used for TBs scheduled by SI/P/RA RNTI.

In one embodiment, a base graph used for common messages can be predetermined. In one example, the base graph may be LDPC base graph 2.

In another embodiment, the maximum transport block size for TB scheduled by one of SI/P or RA RNTI is pre-determined. In one example, the maximum value is 3824.

In another embodiment, the transport block size for TB scheduled by one of SI/P or RA RNTI can be determined based on a TBS_indicator and a TBS_index value indicated in the corresponding DCI. For example, this can be given in or configured by the Table TBS_Table_1_0 of FIG. 10.

In another embodiment, the transport block size for TB scheduled by one of SI/P or RA RNTI can be determined based on a fixed TBS_indicator, and a TBS_index value indicated in the corresponding DCI. For example, this can be given in or configured by the Table TBS_Table_1_0 with TBS_indicator set to 0. In another example, this can be given in or configured by the Table TBS_Table_1_0 with TBS_indicator set to 1.

In another embodiment, the modulation order is limited to QPSK for encoding (or decoding) TB scheduled by one of SI/P or RA RNTI.

In another embodiment, full buffer rate-matching can be applied for encoding (or decoding) TB scheduled by one of SI/P or RA RNTI.

Referring to FIG. 12, illustrated is an example table 1200 for a maximum TBS determination that can be implemented according to various aspect or embodiments herein. The TBS design table in TS 38.214 is designed assuming the resource allocation can span up-to 275 resource blocks. However, according to RAN4 spec (TS 38.817-01), the maximum resource block allocation cannot exceed 273 RBs as shown in FIG. 11 with the Table 1100 of Table 4.4.1.1-1: Range 1 NR UE and station BS maximum RB allocation for CP-OFDM.

Thus, the maximum TBS and maximum data rate (see TS to RAN/RAN2 in R1-1721732 and R1-1721733) could also be limited by 273 RB. Thus, from a UE implementation perspective, the transport block size exceeding RB allocation of 273 would not be very useful and it can also lead to unnecessary complexity on UE side. For example, at the Table 1200 some cases (e.g., 102416, 213176, 204976, 426336, 409616, 852696) where the TBS could be unnecessarily increased (requiring the UE to implement higher data rate or TBS which will not be used in practice).

Therefore, in some embodiments, the maximum RB allocation for TBS determination can be limited to 273 so that the peak TBS is reflective of the transport block size that actually leads to the peak data based on RAN4 specifications. Moreover as shown in the table 1200, this proposed change can have a limited impact (i.e. for 256-QAM and QPSK there is no impact). Further, the network communication specifications can still support resource allocation of maximum up to 275 resource blocks as per TS 36.211).

In an embodiment, the TBS determination (in sec 5.1.3.2 of TS 38.214), the maximum value of nPRB can be limited to 273. For instance, nPRB for TBS determination can be given by a minimum (nPRB, 273) where nPRB is the total number of allocated PRBs for the UE.

In one embodiment, the transport block size is determined based on number of allocated PRBs for the UE and a maximum number of PRBs. An example maximum number of PRBs is 273. In another example, the maximum number of PRBs is determined based on gNB signaling and/or based on UE capability signaling. An example of determination of TBS based on minimum of number of allocated PRBs for the UE and a reference maximum number of PRBs. Reference maximum number of PRBs is 273.

In another embodiment, the transport block size is determined based on number of allocated PRBs for the UE and a maximum number of PRBs, when the quantized number of REs allocated for PDSCH within a PRB is larger than a threshold (144). An example maximum number of PRBs is 273. In another example, the maximum number of PRBs is determined based on gNB signaling and/or based on UE capability signaling. An example of determination of TBS based on minimum of number of allocated PRBs for the UE and a reference maximum number of PRBs. Reference maximum number of PRBs is 273.

In one embodiment, the transport block size is determined based on number of allocated PRBs for the UE and a maximum number of PRBs. An example maximum number of PRBs is 273. In another example, the maximum number of PRBs is determined based on gNB signaling/UE capability signaling. An example of determination of TBS can be based on minimum of number of allocated PRBs for the UE and a reference maximum number of PRBs. Reference maximum number of PRBs can be 273.

In another embodiment, the transport block size is determined based on number of allocated PRBs for the UE and a maximum number of PRBs, when the quantized number of REs allocated for PDSCH within a PRB is larger than a threshold (144). An example maximum number of PRBs is 273. In another example, the maximum number of PRBs is determined based on gNB signaling and/or based on UE capability signaling. An example of determination of TBS based on minimum of number of allocated PRBs for the UE and a reference maximum number of PRBs. Reference maximum number of PRBs is 273.

Figure 13:
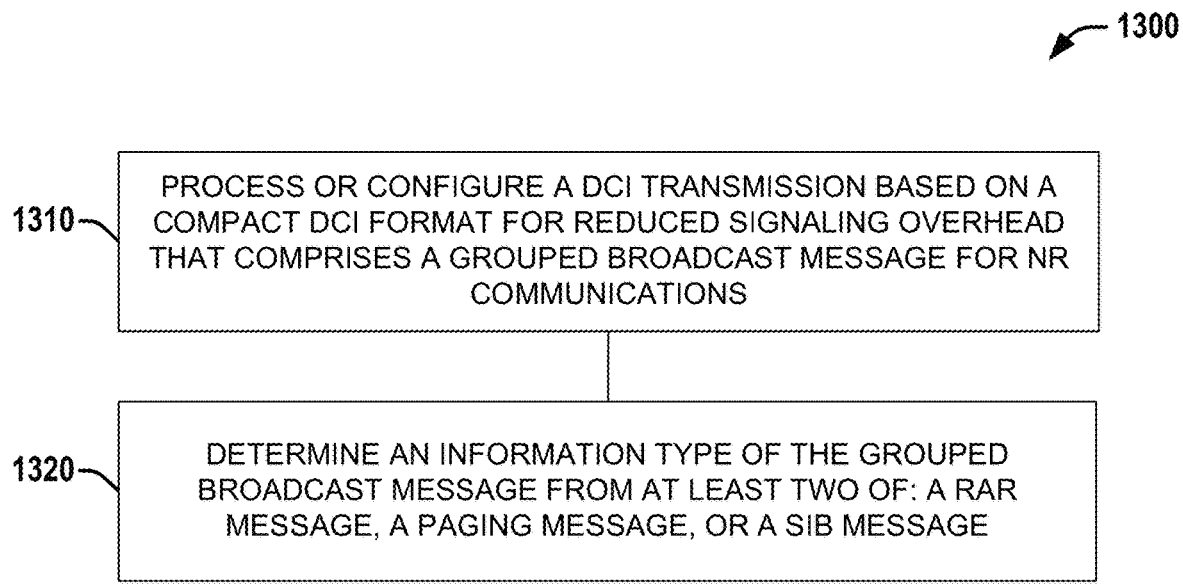
FIG. 13 is a flow diagram of an example method for configuring DCI transmission based on a compact DCI format with a grouped broadcast message, according to various aspects described herein.

Referring to FIG. 13, illustrated an example process flow 1300 for processing or configuring DCI transmissions with a compact DCI format. The process flow 1300 initiates at 1302 by processing (e.g., processor 204G, 430 or 530) a DCI transmission based on a compact DCI format for reduced signaling overhead that comprises a grouped broadcast message for NR communications.

At 1304, the process flow comprises determining an information type of the grouped broadcast message from at least two of: a RAR message, a paging message, or a SIB message.

The processing can further include determining whether the DCI transmission comprises paging information based on a direct indication in a PDCCH only, or both in the PDCCH and a PDSCH based on a flag field of the DCI transmission, wherein the flag field comprises at least a two bit field. The processor can further determine the information type of the grouped broadcast message from at least two of: the RAR message, the paging message, the SIB message, or an SC-MCCH change, based on a dedicated RNTI value that is encoded in a cyclic redundancy check (CRC) of the compact DCI format.

The compact DCI format of a direct indication message and the compact DCI format of paging information on both the PDSCH and the PDCCH cam be processed or configured based on padded reserve information bits that ensure a same size therebetween.

In an aspect, the grouped broadcast message comprises the RAR message, the paging message, and the SIB message, wherein a number of paging records is increased up to about three thousand eight hundred and twenty-four bits.

In another aspect, the DCI transmission be processed or configured based on the compact DCI format according to a reduced number of blind decoding candidates associated with other CCE aggregation levels than a subset of CCE aggregation levels.

Figure 14:
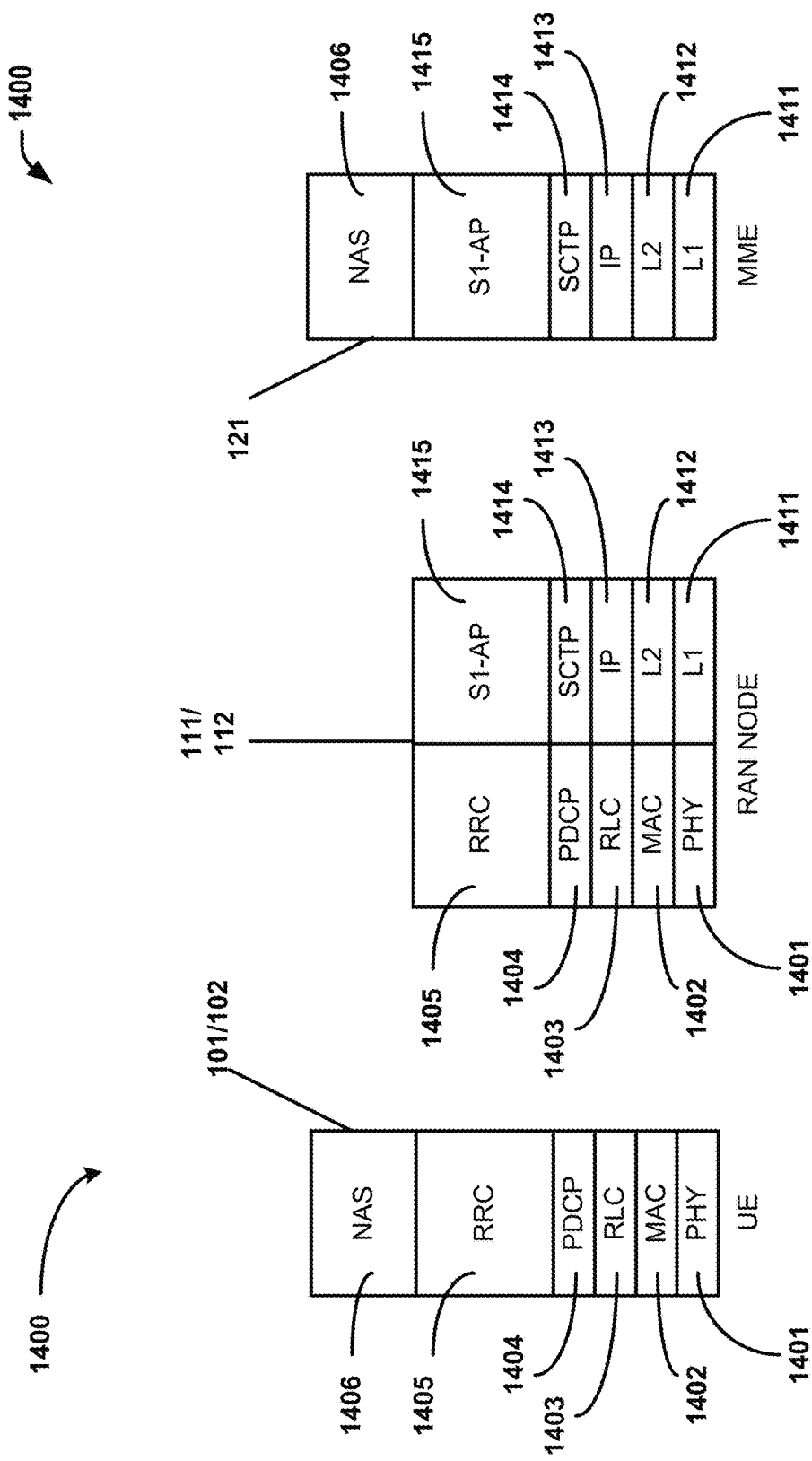
FIG. 14 illustrates a control plane protocol stack that can be implemented for operation of various embodiments and aspects described herein.

FIG. 14 is an illustration of a control plane protocol stack in accordance with various embodiments described herein. In this embodiment, a control plane 1400 is shown as a communications protocol stack between the UE 101 (or alternatively, the UE 102), the RAN node 111 (or alternatively, the RAN node 142), and the MME 121.

The PHY layer 1401 may transmit or receive information used by the MAC layer 1402 over one or more air interfaces. The PHY layer 1401 may further perform link adaptation or adaptive modulation and coding (AMC), power control, cell search (e.g., for initial synchronization and handover purposes), and other measurements used by higher layers, such as the RRC layer 1405. The PHY layer 1401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1403 may operate in a plurality of modes of operation, including: Transparent Mode (TM), Unacknowledged Mode (UM), and Acknowledged Mode (AM). The RLC layer 1403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 1401, the MAC layer 1402, the RLC layer 1403, the PDCP layer 1404, and the RRC layer 1405.

The non-access stratum (NAS) protocols 1406 form the highest stratum of the control plane between the UE 101 and the MME 121. The NAS protocols 1406 support the mobility of the UE 101 and the session management procedures to establish and maintain IP connectivity between the UE 101 and the P-GW 123.

The S1 Application Protocol (S1-AP) layer 1415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1414 may ensure reliable delivery of signaling messages between the RAN node 111 and the MME 121 based, in part, on the IP protocol, supported by the IP layer 1413. The L2 layer 1412 and the L1 layer 1411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 1411, the L2 layer 1412, the IP layer 1413, the SCTP layer 1414, and the S1-AP layer 1415.

FIG. 15 is an illustration of a user plane protocol stack in accordance with one or more embodiments herein. In this embodiment, a user plane 1500 is shown as a communications protocol stack between the UE 101 (or alternatively, the UE 102), the RAN node 111 (or alternatively, the RAN node 112), the S-GW 122, and the P-GW 123. The user plane 1500 may utilize at least some of the same protocol layers as the control plane 1400. For example, the UE 101 and the RAN node 111 may utilize a Uu interface (e.g., an LTE-Uu interface) to exchange user plane data via a protocol stack comprising the PHY layer 1401, the MAC layer 1402, the RLC layer 1403, the PDCP layer 1404.

The General Packet Radio Service (GPRS) Tunneling Protocol for the user plane (GTP-U) layer 1504 may be used for carrying user data within the GPRS core network and between the radio access network and the core network. The user data transported can be packets in any of IPv4, IPv6, or PPP formats, for example. The UDP and IP security (UDP/IP) layer 1503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 1111, the L2 layer 1412, the UDP/IP layer 1503, and the GTP-U layer 1504. The S-GW 122 and the P-GW 123 may utilize an S5/S8a interface to exchange user plane data via a protocol stack comprising the L1 layer 1411, the L2 layer 1412, the UDP/IP layer 1503, and the GTP-U layer 1504. As discussed above with respect to FIG. 14, NAS protocols support the mobility of the UE 101 and the session management procedures to establish and maintain IP connectivity between the UE 101 and the P-GW 123.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus configured to be employed in a next generation NodeB (gNB) for new radio (NR) communications comprising: one or more processors configured to: generate a compact downlink control information (DCI) format that schedules a physical downlink shared channel (PDSCH) comprising a grouped broadcast message including at least two of: a random access response (RAR) message, a paging message, or a system information block (SIB) message, corresponding to a plurality of UEs; a radio frequency (RF) interface, configured to provide, to RF circuitry, data for a transmission of a DCI based on the compact DCI format for reducing signaling overhead.

A second example includes the subject matter of the first example, wherein the one or more processors are further configured to generate a flag field that distinguishes between a direct indication message with paging information located only in a physical downlink control channel (PDCCH) and also further in the PDSCH.

A third example includes the subject matter of any one of the first example through the second example, wherein the flag field comprises at least a two bit flag and the direct indication indicates one or more short paging information to be sent in the compact DCI format without an association to the PDSCH, wherein the one or more short paging information further comprise an emergency message or a system information updated indication.

A fourth example includes the subject matter of any one of the first example through the third example, wherein the one or more processors are further configured to generate the compact DCI format of the direct indication message based on a same size and a same paging radio network temporary identifier (P-RNTI) for cyclic redundancy check (CRC) scrambling as a DCI format scheduling the paging message on the PDSCH, by padding the compact DCI format with reserve information bits.

A fifth example includes the subject matter of any one of the first example through the fourth example, wherein the one or more processors are further configured to vary a size of a compact DCI payload and the flag field among the NR communications based on a change of information in the grouped broadcast message including at least two of: the RAR message, the paging message, the SIB message, or a single cell (SC) multicast control channel (SC-MCCH) change.

A sixth example includes the subject matter of any one of the first example through the fifth example, wherein the one or more processors are further configured to reduce a number of monitoring and decoding operations via the compact DCI format by enabling only a subset of Control Channel Element (CCE) aggregation levels, or a reduced number of blind decoding candidates for other aggregation levels than the subset of CCE aggregation levels.

A seventh example includes the subject matter of any one of the first example through the sixth example, wherein the one or more processors are further configured to generate an extended payload size of the paging message up to about three thousand eight hundred and twenty-four bits.

An eighth example includes the subject matter of any one of the first example through the seventh example, wherein a dedicated radio network temporary identifier (RNTI) value indicates whether the RAR message, the paging message or the SIB message is included in the grouped broadcast message.

A ninth example includes the subject matter of any one of the first example through the eight example, wherein the compact DCI format comprises a reduced number of bits compared to a broadcast DCI format 1_0, and a reference number of physical resource blocks that comprises up to two hundred and seventy-three resource blocks.

A tenth example can be an apparatus configured to be employed in a user equipment (UE) for new radio (NR) communications comprising: one or more processors configured to: process a downlink control information (DCI) transmission based on a compact DCI format for reduced signaling overhead, wherein the compact DCI format comprises a grouped broadcast message that comprises at least two information types of: a random access response (RAR) message, a paging message, or a system information block (SIB) message; a radio frequency (RF) interface, configured to provide, to RF circuitry, data for processing the DCI transmission based on the compact DCI format.

An eleventh example includes the subject matter of the tenth example, wherein the one or more processors are further configured to distinguish between a direct indication message that includes paging information only in a physical downlink control channel (PDCCH) and both in the PDCCH and a physical downlink shared channel (PDSCH) based on a flag field of the DCI transmission.

A twelfth example includes the subject matter of any one of the tenth example through the eleventh example, wherein the one or more processors are further configured to determine the information types of the DCI transmission based on a dedicated radio network temporary identifier (RNTI) value, or based on an X-bit identifier information element (IE) in the compact DCI format, wherein X is an integer equal to or greater than one.

A thirteenth example includes the subject matter of any one of the tenth example through the twelfth example, wherein the one or more processors are further configured to process an indication in an IE of a single cell (SC) multicast control channel (SC-MCCH) change of a next period.

A fourteenth example includes the subject matter of any one of the tenth example through the thirteenth example, wherein the one or more processors are further configured to process the downlink control information (DCI) transmission based on the compact DCI format according to a subset of control channel element (CCE) aggregation levels from a larger set of CCE aggregation levels or a reduced number of blind decoding candidates associated with other CCE aggregation levels than the subset of CCE aggregation levels.

A fifteenth example includes the subject matter of any one of the tenth example through the fourteenth example, wherein the one or more processors are further configured to process the compact DCI format of a direct indication message based on padded reserve information bits that ensure the compact DCI format comprises a same size as a DCI format scheduling the paging message on the PDSCH.

A sixteenth example includes the subject matter of any one of the tenth example through the fifteenth example, wherein the compact DCI format is configured to enable slot-based scheduling and non-slot based PDSCH scheduling, wherein the non-slot based scheduling comprises a duration of a group consisting of 2, 4 and 7 OFDM symbols.

A seventeenth example includes the subject matter of any one of the tenth example through the sixteenth example, wherein the compact DCI format comprises a limited modulation and coding scheme (MCS) that supports only quadrature phase shift keying (QPSK), and a reduced set of coding rate and transport block sizes.

An eighteenth example includes the subject matter of any one of the tenth example through the seventeenth example, wherein the compact DCI format comprises a reference number of physical resource blocks that comprises up to two hundred and seventy-three resource blocks.

A nineteenth example is a computer readable storage device storing executable instructions that, in response to execution, cause one or more processors of a user equipment (UE) to perform operations, the operations comprising: processing a downlink control information (DCI) transmission based on a compact DCI format for reduced signaling overhead that comprises a grouped broadcast message for new radio (NR) communications; and determining an information type of the grouped broadcast message from at least two of: a random access response (RAR) message, a paging message, or a system information block (SIB) message.

A twentieth example includes the subject matter of the nineteenth example, wherein the operations further comprise: determine whether the DCI transmission comprises paging information based on a direct indication in a physical downlink control channel (PDCCH) only or both in the PDCCH and a physical downlink shared channel (PDSCH) based on a flag field of the DCI transmission, wherein the flag field comprises at least a two bit field.

A twenty-first example includes the subject matter of any one of the nineteenth example through the twentieth example, wherein the operations further comprise: determining the information type of the grouped broadcast message from at least two of: the random access response (RAR) message, the paging message, the system information block (SIB) message, or a single cell (SC) multicast control channel (SC-MCCH) change, based on a dedicated radio network temporary identifier (RNTI) value that is encoded in a cyclic redundancy check (CRC) of the compact DCI format.

A twenty-second example includes the subject matter of any one of the nineteenth example through the twenty-first example, wherein the operations further comprise: process the compact DCI format of a direct indication message and the compact DCI format of paging information on both the PDSCH and the PDCCH based on padded reserve information bits that ensure a same size therebetween.

A twenty-third example includes the subject matter of any one of the nineteenth example through the twenty-second example, wherein the grouped broadcast message comprises the RAR message, the paging message, and the SIB message, wherein a number of paging records is increased up to about three thousand eight hundred and twenty-four bits.

A twenty-fourth example includes the subject matter of any one of the nineteenth example through the twenty-third example, wherein the operations further comprise: process the downlink control information (DCI) transmission based on the compact DCI format according to a reduced number of blind decoding candidates associated with other CCE aggregation levels than a subset of CCE aggregation levels.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

Examples can include an apparatus comprising logic, modules, or circuitry to perform one or more elements of a method described in or related to any of examples above, or any other method or process described herein.

Examples can include a method, technique, or process as described in or related to any of examples above, or portions or parts thereof.

Examples can include an apparatus comprising: one or more processors and one or more computer readable media comprising instructions that, when executed by the one or more processors, cause the one or more processors to perform the method, techniques, or process as described in or related to any of examples above, or portions thereof.

Examples can include a method of communicating in a wireless network as shown and described herein.

Examples can include a system for providing wireless communication as shown and described herein.

Examples can include a device for providing wireless communication as shown and described herein.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.14 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2).

Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in a next generation NodeB (gNB) for new radio (NR) communications comprising:
one or more processors configured to:
generate a compact downlink control information (DCI) format that schedules a physical downlink shared channel (PDSCH) comprising a grouped broadcast message including at least one of: a random access response (RAR) message, a paging message, or a system information block (SIB) message, and an indication in an information element of a single cell (SC) multicast control channel (SC-MCCH) change of a next period, corresponding to a plurality of UEs; and
reduce a number of monitoring and decoding operations via the compact DCI format by enabling only a subset of Control Channel Element (CCE) aggregation levels, or a reduced number of blind decoding candidates for other aggregation levels than the subset of CCE aggregation levels;
a radio frequency (RF) interface, configured to provide, to RF circuitry, data for a transmission of a DCI based on the compact DCI format for reducing signaling overhead.

2. The apparatus of claim 1, wherein the one or more processors are further configured to generate a flag field that distinguishes between a direct indication message with paging information located only in a physical downlink control channel (PDCCH) and also further in the PDSCH.

3. The apparatus of claim 2, wherein the flag field comprises at least a two bit flag and the direct indication message indicates one or more short paging information to be sent in the compact DCI format without an association to the PDSCH, wherein the one or more short paging information further comprise an emergency message or a system information updated indication.

4. The apparatus of claim 2, wherein the one or more processors are further configured to generate the compact DCI format of the direct indication message based on a same size and a same paging radio network temporary identifier (P-RNTI) for cyclic redundancy check (CRC) scrambling as a DCI format scheduling the paging message on the PDSCH, by padding the compact DCI format with reserve information bits.

5. The apparatus of claim 1, wherein the one or more processors are further configured to vary a size of a compact DCI payload and a flag field among the NR communications based on a change of information in the grouped broadcast message including at least two of: the RAR message, the paging message, the SIB message, or the single cell (SC) multicast control channel (SC-MCCH) change.

6. The apparatus of claim 1, wherein the one or more processors are further configured to generate an extended payload size of the paging message up to about three thousand eight hundred and twenty-four bits.

7. The apparatus of claim 1, wherein a dedicated radio network temporary identifier (RNTI) value indicates whether the RAR message, the paging message or the SIB message is included in the grouped broadcast message.

8. The apparatus of claim 1, wherein the compact DCI format comprises a reduced number of bits compared to a broadcast DCI format 1_0, and a reference number of physical resource blocks that comprises up to two hundred and seventy-three resource blocks.

9. An apparatus configured to be employed in a user equipment (UE) for new radio (NR) communications comprising:
one or more processors configured to:
process a downlink control information (DCI) transmission based on a compact DCI format for reduced signaling overhead, wherein the compact DCI format comprises a grouped broadcast message that comprises at least one information type of:
a random access response (RAR) message, a paging message, or a system information block (SIB) message, and an indication in an information element (IE) of a single cell (SC) multicast control channel (SC-MCCH) change of a next period, and wherein the processing the downlink control information (DCI) transmission is based on the compact DCI format according to a subset of control channel element (CCE) aggregation levels from a larger set of CCE aggregation levels or a reduced number of blind decoding candidates associated with other CCE aggregation levels than the subset of CCE aggregation levels;
a radio frequency (RF) interface, configured to provide, to RF circuitry, data for processing the DCI transmission based on the compact DCI format.

10. The apparatus of claim 9, wherein the one or more processors are further configured to distinguish between a direct indication message that includes paging information only in a physical downlink control channel (PDCCH) and both in the PDCCH and a physical downlink shared channel (PDSCH) based on a flag field of the DCI transmission.

11. The apparatus of claim 9, wherein the one or more processors are further configured to determine information types of the DCI transmission based on a dedicated radio network temporary identifier (RNTI) value, or based on an X-bit identifier information element (IE) in the compact DCI format, wherein X is an integer equal to or greater than one.

12. The apparatus of claim 9, wherein the one or more processors are further configured to process the compact DCI format of a direct indication message based on padded reserve information bits that ensure the compact DCI format comprises a same size as a DCI format scheduling the paging message on a PDSCH.

13. The apparatus of claim 9, wherein the compact DCI format is configured to enable slot-based scheduling and non-slot based PDSCH scheduling, wherein the non-slot based PDSCH scheduling comprises a duration of a group consisting of 2, 4 and 7 OFDM symbols.

14. The apparatus of claim 9, wherein the compact DCI format comprises a limited modulation and coding scheme (MCS) that supports only quadrature phase shift keying (QPSK), and a reduced set of coding rate and transport block sizes.

15. The apparatus of claim 9, wherein the compact DCI format comprises a reference number of physical resource blocks that comprises up to two hundred and seventy-three resource blocks.

16. A non-transitory computer readable storage device storing executable instructions that, in response to execution, cause one or more processors of a user equipment (UE) to perform operations, the operations comprising:
processing a downlink control information (DCI) transmission based on a compact DCI format for reduced signaling overhead that comprises a grouped broadcast message for new radio (NR) communications, wherein the processing the downlink control information (DCI) transmission is further based on the compact DCI format according to a reduced number of blind decoding candidates associated with other CCE aggregation levels than a subset of CCE aggregation levels; and
determining an information type of the grouped broadcast message from at least one of: a random access response (RAR) message, a paging message, or a system information block (SIB) message, and an indication in an information element (IE) of a single cell (SC) multicast control channel (SC-MCCH) change of a next period.

17. The non-transitory computer readable storage device of claim 16, wherein the operations further comprise:
determine whether the DCI transmission comprises paging information based on a direct indication message in a physical downlink control channel (PDCCH) only or both in the PDCCH and a physical downlink shared channel (PDSCH) based on a flag field of the DCI transmission, wherein the flag field comprises at least a two bit field.

18. The non-transitory computer readable storage device of claim 16, wherein the operations further comprise:
determining the information type of the grouped broadcast message from at least two of: the random access response (RAR) message, the paging message, the system information block (SIB) message, or the SC-MCCH change, based on a dedicated radio network temporary identifier (RNTI) value that is encoded in a cyclic redundancy check (CRC) of the compact DCI format.

19. The non-transitory computer readable storage device of claim 16, wherein the operations further comprise:
process a compact DCI format of a direct indication message and a compact DCI format of paging information on both a PDSCH and a PDCCH based on padded reserve information bits that ensure a same size therebetween.

20. The non-transitory computer readable storage device of claim 16, wherein the grouped broadcast message comprises the RAR message, the paging message, and the SIB message, wherein a number of paging records is increased up to about three thousand eight hundred and twenty-four bits.

* * * * *